Dec. 4, 1923.  
E. A. BIGLER  
AUTOMATIC GATE  
Filed June 9, 1922
1,476,354
4 Sheets-Sheet 1
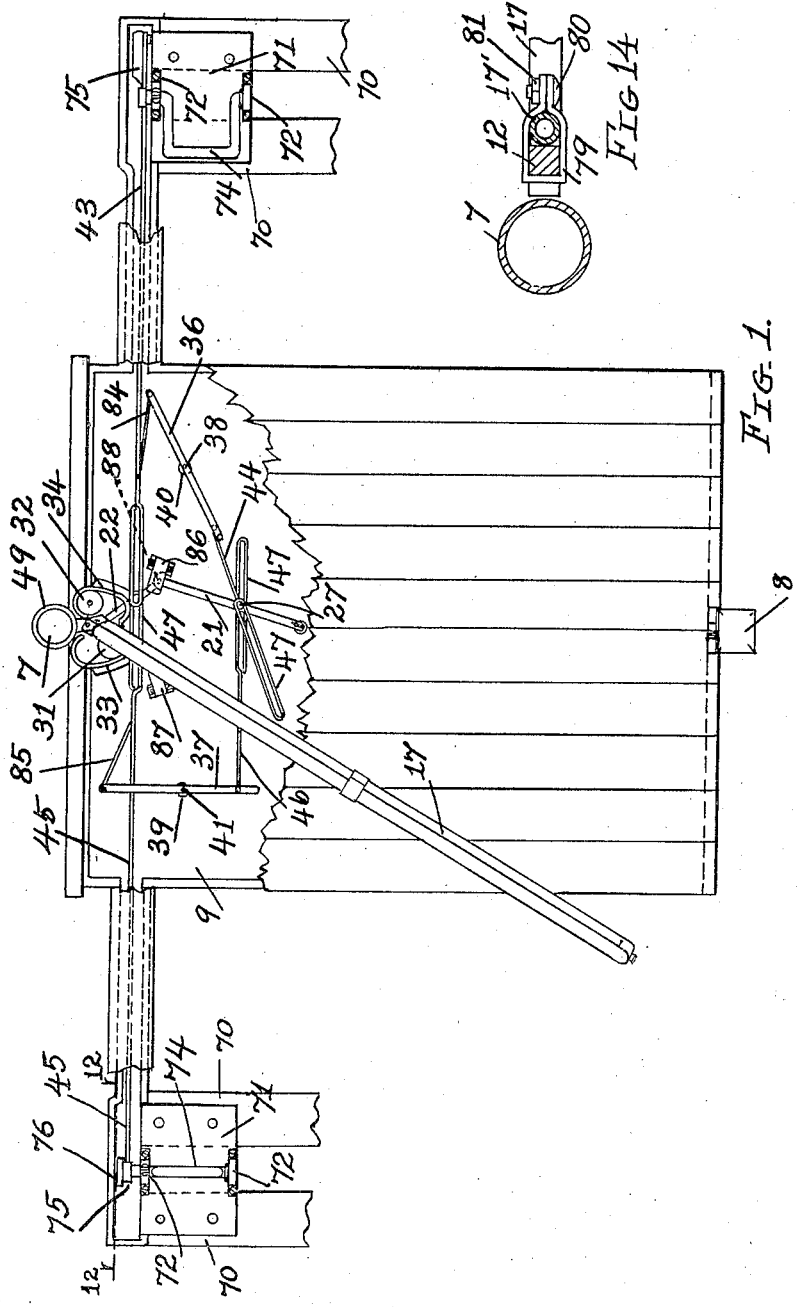
Witnesses  
Wayne Hudson  
Charlotte A. DuBois.
Inventor  
EDWARD A. BIGLER  
by Atty. N. DuBois.

Dec. 4, 1923. 1,476,354
E. A. BIGLER
AUTOMATIC GATE
Filed June 9, 1922 4 Sheets-Sheet 2
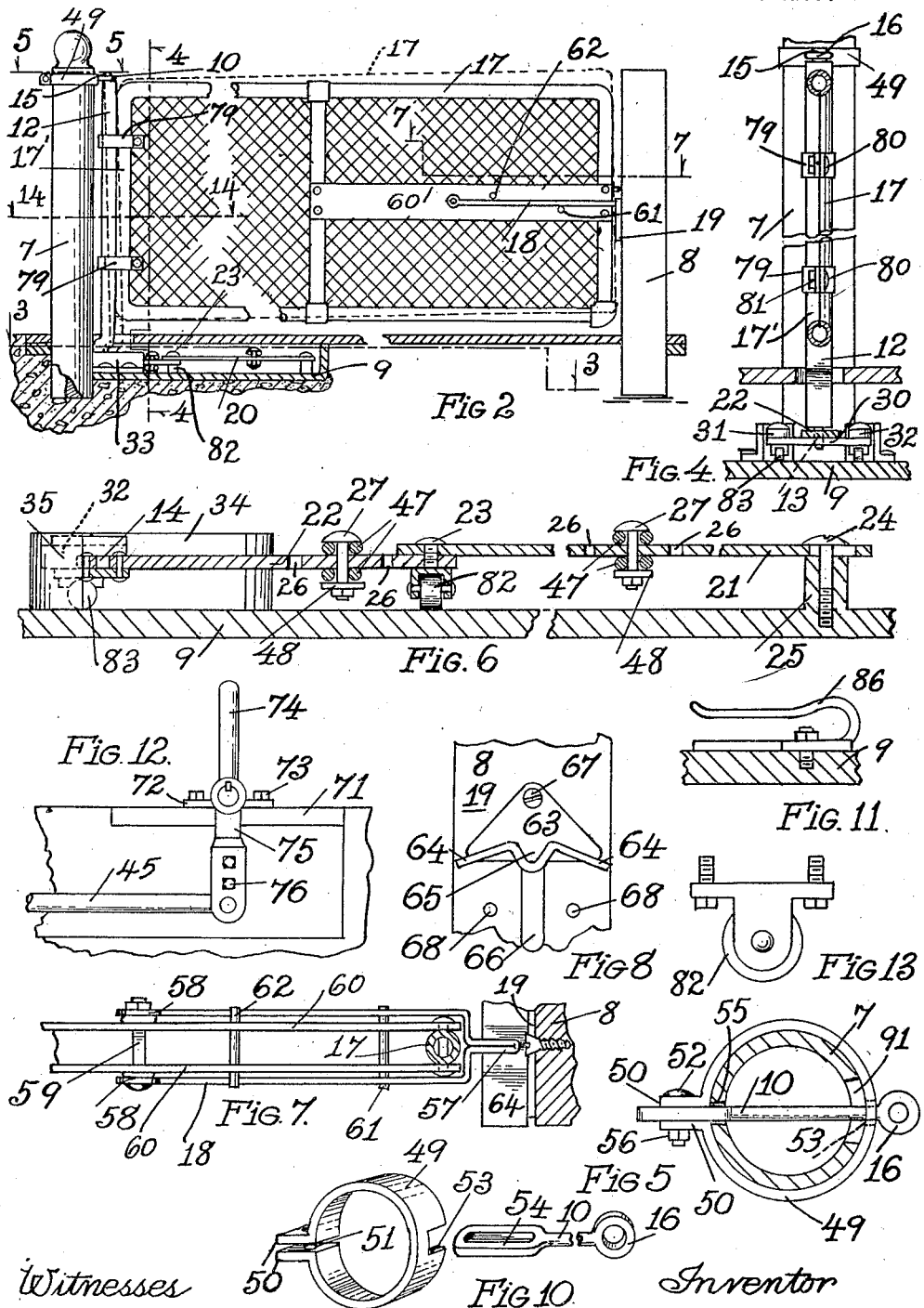
Witnesses
Wayne Hudson
Charlotte A. DuBois
Inventor
Edward A. Bigler
by Atty. N. DuBois

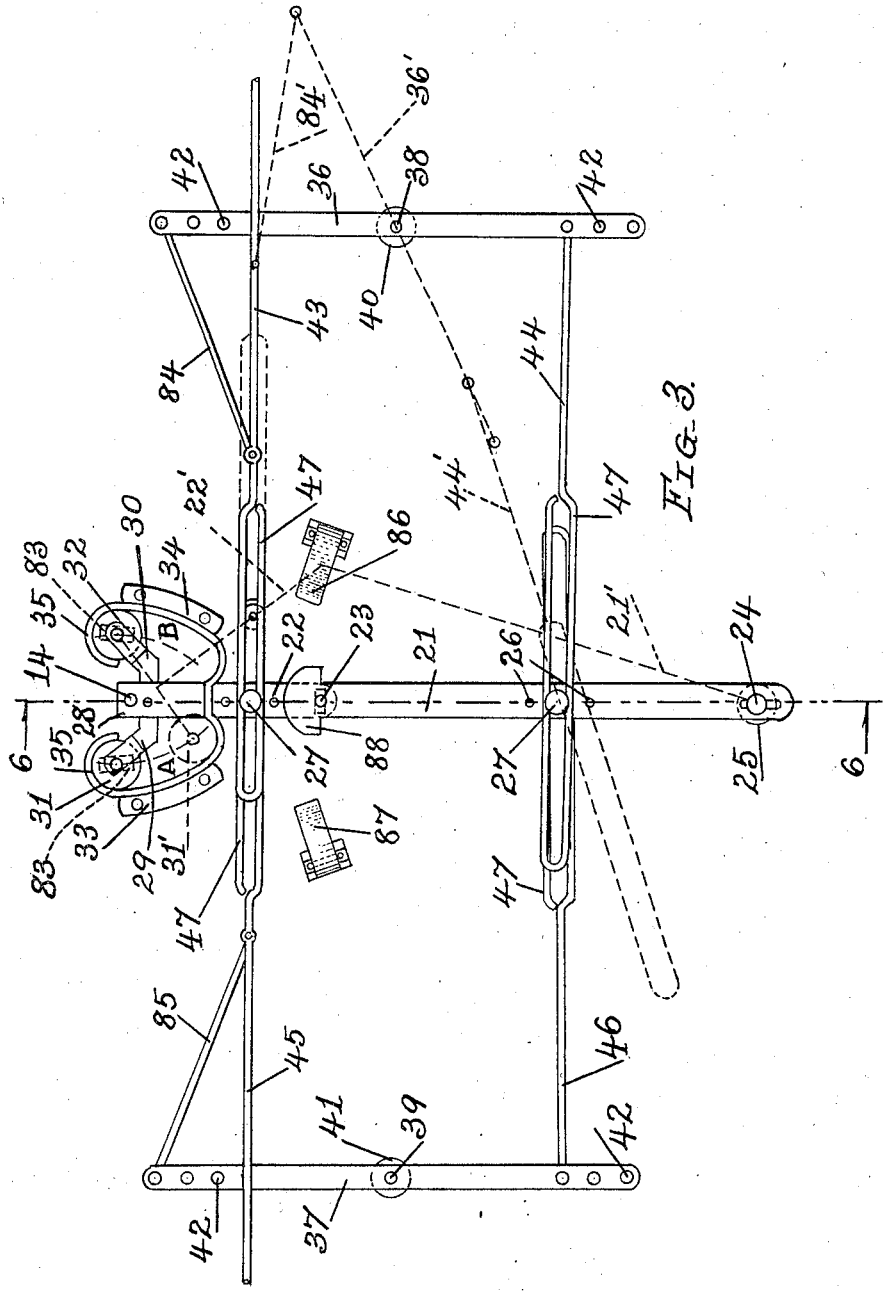

Dec. 4, 1923.
E. A. BIGLER
1,476,354
AUTOMATIC GATE
Filed June 9, 1922   4 Sheets-Sheet 4
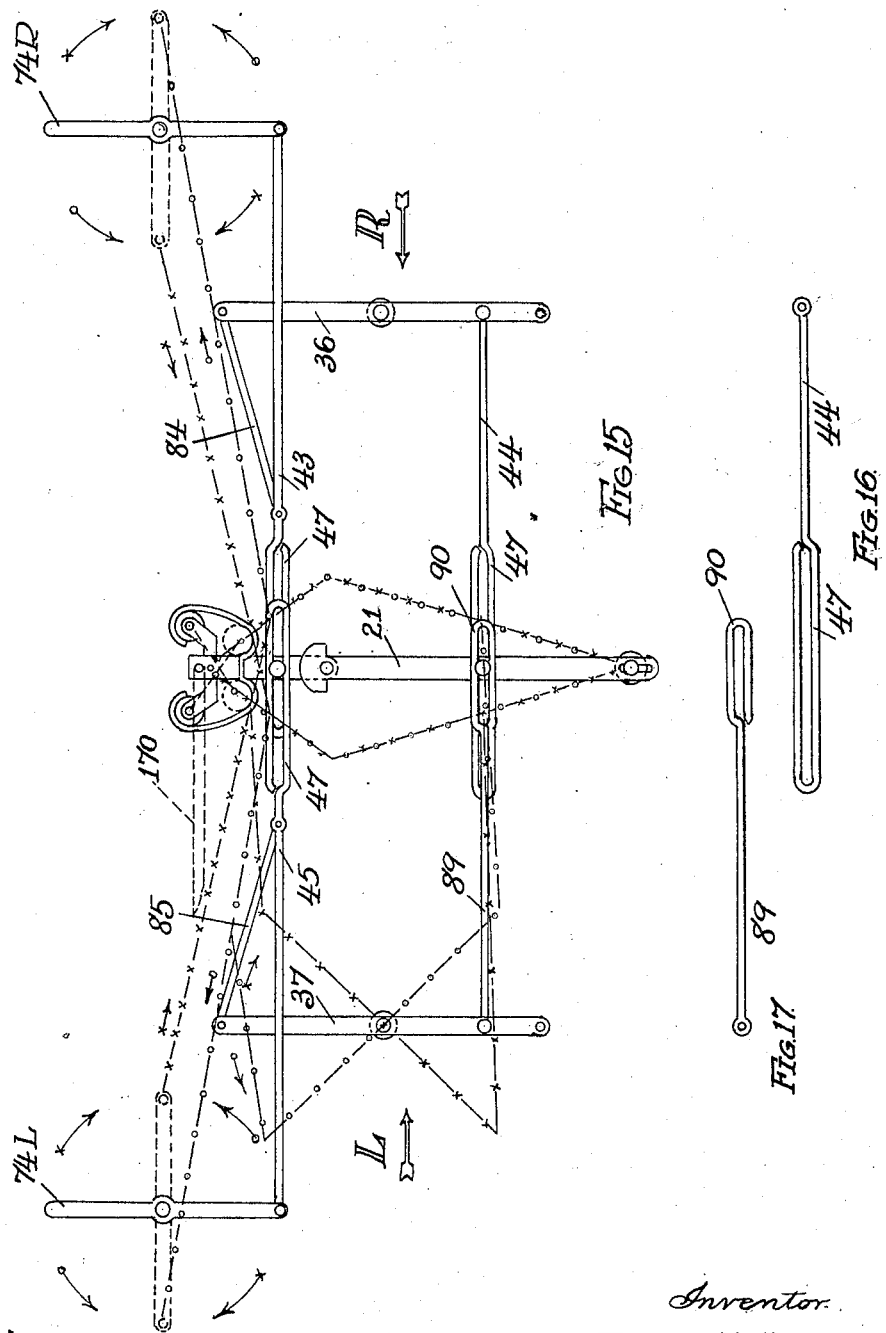
Witnesses
Wayne Hudson
Charlotte A. DuBois
Inventor
Edward A. Bigler
by Atty. N. DuBois Patented Dec. 4, 1923.

1,476,354

UNITED STATES PATENT OFFICE.

EDWARD A. BIGLER, OF AUBURN, ILLINOIS.

AUTOMATIC GATE.

Application filed June 9, 1922. Serial No. 567,031.

*To all whom it may concern:*

Be it known that I, EDWARD A. BIGLER, a citizen of the United States, residing at Auburn, in the county of Sangamon and State of Illinois, have invented a new and useful Automatic Gate, of which the following is a specification.

The invention relates to automatic gates of the kind which are operative by a vehicle approaching the gate to open the gate, and are operative by a vehicle going away from the gate to close the gate.

The purposes of the invention are: to provide a swinging gate having an axis inclinable in the plane of the gate frame to cause lifting of the free end of the gate, inclinable laterally in one direction to cause the gate to swing outwardly and inclinable laterally in the opposite direction to cause the gate to swing inwardly; to provide improved means for adjusting the axis of the gate.

To provide improved gate-operating mechanism including crank-shafts effective to automatically open the gate by the weight of an approaching vehicle and to close the gate by the weight of a departing vehicle.

To provide improved means whereby the free end of the gate frame will be lifted to unlatch it and allow it to swing open by gravity, and to so change the relative positions of the pivotal points of the gate's axis that the gate will swing shut by gravity.

To provide modified automatic gate-operating mechanism normally effective to open the gate in one direction, either inwardly or outwardly as may be desired.

To provide an improved automatic gate latch, comprising a notched gravitating latch-block attached to the post towards which the gate closes and coacting with a latch of resilient material carried on the gate frame and automatically engaging in the notch of the gravitating latch-block, to effectually hold the gate frame after it has swung into closed position from either direction.

To provide means for adjusting the upper pivot of the gate's axis in such manner that the longitudinal bars of the gate frame will be level when the gate frame is in equilibrium and the latch is in the notch of the latch-block and to provide simple and effective means for adjusting the working parts of the mechanism in operative relation to each other in order that the gate may easily be kept in good working order.

With these purposes in view the invention consists in the novel features of construction and combinations of parts, shown in the accompanying drawings, to which reference is hereby made; and will now be described in detail and finally recited in the claims.

Figure 1 is a top plan of an automatic gate embodying my invention, the gate being shown partly open;

Fig. 2 is a side elevation of the same gate closed, some of the parts being shown in section;

Fig. 3 is an enlarged top plan of the system of levers, connecting rods and co-operating parts, used to operate the gate, the changed positions of the operating parts on one side being indicated by dotted lines;

Fig. 4 is an enlarged vertical section taken on the line 4—4 of Fig. 2;

Fig. 5 is an enlarged horizontal section taken on the line 5—5 of Fig. 2 looking downward;

Fig. 6 is an enlarged vertical section through the truck and the bed-plate, taken on the line 6—6 of Fig. 3;

Fig. 7 is an enlarged horizontal section through the second or latch-supporting post, taken on the line 7—7 of Fig. 2;

Fig. 8 is an enlarged side elevation of a fragment of the latch post and shows the gravitating latch in place on the post;

Fig. 9 is an enlarged perspective view of the adjusting band surrounding the upper part of the main post;

Fig. 10 is an enlarged perspective view of the adjusting bar co-operating with adjusting band;

Fig. 11 is an enlarged edge view of one of the spring clips;

Fig. 12 is a fragmentary side elevation showing a detail of one crank shaft;

Fig. 13 is an enlarged side view of one of the wheels which support the truck;

Fig. 14 is an enlarged horizontal section taken on the line 14—14 of Fig. 2;

Fig. 15 is a diagrammatic view showing a relatively short connecting rod in operative relation to other elements of the mechanism, and illustrating the mode of operating the gate to always open in one and the same direction, regardless of the direction in which the vehicle which operates the gate may be moving;

Fig. 16 is a top plan of one long-loop connecting rod; and Fig. 17 is a top plan of the substitute connecting rod.

The same reference numerals designate the same parts in all the views.

The gate structure (Fig. 2) comprises an immovable first or main post 7; an immovable second post 8 in line with the post 7; a stationary horizontal bed plate 9 preferably of cast iron, adjacent to the post 7; an adjusting bar 10 movable outwardly, inwardly, and laterally relatively to the axis of the post 7; a truck, designated as a whole by the numeral 20, adapted to travel on the bed-plate 9; an upright axle 12 having at its lower end a pivot 13 (Fig 4) rotative in a suitable bearing 14 (Figs. 3 and 6) on the truck 20 and having at its upper end a pivot 15 rotative in an eye 16 at one end of the bar 10; a gate-frame 17, of any approved construction, attached to and supported by the axle 12; a latch 18 pivoted on the gate-frame 17; and a gravitating latch-block 19 pivoted on the post 8 and engaged by the latch 18 to hold the gate-frame normally in closed position.

The truck and appurtenances will now be described.

The truck, which will preferably be made of wrought iron, comprises two horizontal members 21 and 22 connected by a pivot 23 (Figs. 2 and 6). The member 21 is pivotally connected plate and has also a series of holes 26 either one of which will receive a removable bolt 27. The member 22 has forked lateral branches 29 and 30, one on each side of the member and rollers 31 and 32 which rotate in the forks of the respective branches. The member 22 has also an extension 28 which carries a bearing 14 receiving the pivot 13 (Fig. 4) at the lower end of the axle 12. A roller 82 (Fig. 6) supports the united truck members 21 and 22 and facilitates the "breaking" of the truck and similar rollers 83 support the branches 29 and 30 and facilitate lateral movement of the free end of the member 22.

Guards 33 and 34, adjacent to the respective branches 29 and 30, are secured on the bed-plate 9. The rollers 31 and 32 traverse the respective guards, the extent of the travel being limited by the arched terminals 35, of the guards. Levers 36 and 37 are oscillative on the respective pivots 38 and 39 on blocks 40 and 41 which are preferably integral with the bed-plate 9. Each of the levers 36 and 37 has a plurality of holes 42 (Fig. 3) to receive the pivotal pins of the connecting rods now to be described. The connectng rods 43 and 44 co-operate with the lever 36; and the connecting rods 45 and 46 co-operate with the lever 37. The rod 43 is connected with the lever 36 by a secondary rod 84, and the rod 45 is connected with the lever 37 by a secondary rod 85. Each of the connecting rods 43, 44, 45 and 46 has a longitudinal loop 47 adapted to receive the bolts 27 which connect the rods with the truck members 21 and 22 in such manner that the rods may slide on the bolts to an extent limited by the length of the loop. The loop 47 of the connecting rod 43 lies above the truck member 22, the loop of the rod 44 lies above the member 21, the loop of the rod 45 lies below the member 22 and the loop of the rod 46 lies below the member 21. The rods are disposed above and below the truck members, as described, in order to equalize the pull on the upper and lower parts of the bolts 27. The loops of the rods 45 and 46 are supported by washers 48 (Fig. 6) secured on the respective bolts 27.

The axle and the means for attaching it to gate frames of usual construction are clearly shown in Figs. 2, 4 and 14.

The axle 12 is an iron bar, preferably of polygonal cross-section, having at its upper end a pivot 15 co-axial with the bar and having at its lower end a pivot 13 in the same vertical plane with the axes of the post 7 and the axle 12, but not in line with the pivot 15; the pivot 13 being relatively near the post and the pivot 15 being farther away from the post. Straps or clamps 79 of steel or other resilient metal are shaped to conform to the surface of the axle and the surface of the upright member 17′ of the gate frame 17 and have extensions 79′ having aligned transverse holes to receive bolts 80 extending through the extensions. Nuts 81 screwed tightly on the bolts 80 draw the extensions 79′ together to secure the axle 12 on the gate frame member 17′.

A band 49, of springy metal, surrounds the post 7, and has outwardly extended members 50 (Figs. 5, 9 and 10) having aligned holes 51 to receive a bolt 52; the band 49 has also a notch 53 adapted to permit sliding of the bar 10 in the notch.

The bar 10 has a longitudinal slot 54 (Fig. 10) to permit the bar to slide on the bolt 52 to admit of inward and outward adjustment of the bar. The post 7 has horizontal transverse slots 55 and 91.

The bar 10 extends through the notch 53 in the band 49, through the slots 91 and 55, and outwardly between the members 50 and has an eye 16 to receive the pivot 15 at the upper end of the axle 12.

When the nut 56 on the bolt 52 is loosened the band 49 will be free to rotate part way around the post to admit of lateral adjustment of the bar 10 relatively to the axis of the post; and the bar 10 will be free to slide inwardly or outwardly on the bolt 52, to adjust the eye 16 relatively to the axis of the post 7.

The latch 18 (Figs. 2 and 7), is preferably a rod of springy metal bent centrally back on itself to form an outwardly projecting finger 57, and also bent to form eyes 58 at the respective ends of the rod.

A bolt 59 extends through the member 60 of the gate frame and through the eyes 58 and the latch oscillates on the bolt. Pins 61 and 62, one above and the other below the latch, extend through the members 60 and limit upward and downward movement of the latch, to keep it in such position that it will never fail to engage the latch-block properly, and also to effect proper stress of the latch to hold the finger 57 in the notch 65 of the latch-block and thereby prevent rattling of the parts and to prevent accidental lifting of the latch.

The latch-block designated as a whole by the numeral 19, is preferably a casting comprising a vertical triangular plate 63; inclined members 64, integral with and at right angles to the face of the plate; a notch 65 separating the members 64; and an integral weight 66. The latch-block is supported in operative position on the post 8 by a screw 67 on which the latch-block is free to oscillate and the weight 66 gravitates downwardly to return the block to normal or vertical position after it has been swung either to the right or to the left. Stationary pins, 68, one on each side of the weight, limit the oscillations of the block.

Stationary sills 70, (Fig. 1) parallel to the gate frame are located two on each side of the gate, and at a distance from the gate sufficient to accommodate the longest vehicle likely to be used to operate the gate.

Plates 71, secured on the respective sills, have boxes 72, secured by bolts 73.

Crank-shafts 74 are oscillative in the boxes 72. Arms 75, secured on the respective crank-shafts, are equipped with weights 76 which gravitate to normally keep each of the cranks 74 in a vertical plane.

The looped rods 43 and 45 are operatively connected with the respective arms 75 and each rod exerts a straight pull on the pin 27 to break the truck to the right, or to the left to cause the gate to swing to the left, or to the right, as the case may be.

Rods 84 and 85 connect the rods 43 and 45 with the respective levers 36 and 37.

In practice it is necessary to adjust the axis of the axle 12 so that it will normally lie in the vertical plane of the closed gate frame, but will be inclined, from the top downwardly towards the vertical axis of the supporting post; in order that when the gate frame is closed it will normally tend to remain in that position.

When the parts are properly assembled the end of the extension 28 will be near the post 7 and the axes of the bearing 14 (Fig. 6), the pivot 23, the bolt 27 and the screw 24, will all be in the same vertical plane; the pivot 13 will be in the bearing 14 in the truck-member 22, and the pivot 15 will be in the eye 16, of the adjusting bar 10. To effect the adjustment of the axle the nut 56, on the bolt 52, will be loosened and the bar 10 will be slid inwardly or outwardly as the case may be, and the band 49 will be rotated to right or to left, as the case may be, to place the eye 16 in such position that it will be in the vertical plane of the gate frame in line with the bearing 14; and the nut 56 will then be tightened to secure the parts in their adjusted position.

The axle 12 being inclined in the vertical plane of the closed gate frame and the gate frame being attached to and supported by the axle; the longitudinal rails of the gate will be level when it is closed. If the bearing 14 be moved away from the post 7, in the direction of the length of the gate frame the first effect will be to raise the free end of the gate-frame as indicated by dotted lines in Fig. 2, and thereby lift the latch-finger 57 out of the notch 65 in the latch-block, leaving the gate frame free to swing in either direction.

The moving of the bearing 14 to the left will cause the axle 12 to incline from the top downwardly towards the left, with the result that the gate-frame will automatically swing to the right; and conversely, the moving of the bearing 14 to the right will cause the axle 12 to incline from the top downwardly towards the right with the result that the gate frame will automatically swing to the left.

Upon pulling the rod 43 to the right, the parts 31, 22, 21, 36, 84 and 44, will move to the respective positions 31', 22', 21', 36', 84' and 44'; shown by dotted lines in Fig. 3 and the head 88 of the truck member 21 will be held by the spring clip 86, which exerts sufficient pressure to prevent accidental withdrawal of the head but yields to release the head when the rod 45 is pulled to the left.

When the truck breaks to the left the head 88 will enter and will be held by the clip 87.

The first stage of the swing of the truck-member 21 either to the right or to the left, will cause the extension 28 to recede from the post 7 to lift the free end of the gate frame and cause retracting of the latch finger 27 from the notch 65, and continued swing of the member 21 to the right or to the left will cause the gate frame to swing reversely to the left, or to the right, as the case may be.

The extended truck is in line with the posts 7 and 8, and is rigid and effective to prevent lifting the gate so long as the members 21 and 22 remain in line, but is adapted to "break" laterally towards the left, to cause the member 22 to swivel on the pivot of the roller 31 to move the bearing 14 in the arc "A," towards the left, to cause the axle 12 to incline from the top downwardly towards the left, resulting in the gravitating of the gate frame towards the right and is also adapted to "break" towards the right to cause the member 22 to swivel on the pivot of the roller 32 to move the bearing 14 in the arc "B" towards the right, to cause the axle 12 to incline from the top downwardly towards the right, resulting in the gravitating of the gate frame towards the left.

The means for causing the gate frame to gravitate to the left when operated by a vehicle approaching the gate from the right; and to gravitate to the right when operated by a vehicle approaching the gate from the left and always to swing away from the operating vehicle are important features of the present invention.

In case the wheel of the operating vehicle passes over the crank-shaft and operates the gate to swing it away from the vehicle, and the driver changes his mind and wishes to go back without going through the gate, it will only be necessary to back the vehicle so that one wheel will run over the same crank-shaft and will thereby cause the closing of the gate.

An objection common to automatic gates used prior to my invention is that the closing of the gate is effected from the side opposite to the side from which it is opened. A practical advantage of the present construction is that the gate may be closed by the same crank-shaft that operated to open it, by simply reversing the motion of that crank-shaft.

When the gate is closed, the operation of either crank-shaft by a vehicle approaching the gate, will open the gate. When the gate is open, the operation of either crank-shaft by a vehicle leaving the gate will close the gate.

When the lay of the ground is such that the gate can open in one direction only, the construction may be modified without departure from my invention; and for this purpose I provide a substitute connecting rod 89, having a relatively short loop 90 co-operating with the levers 36 and 37 and the rods 43, 44 and 45 in such manner that the gate frame will always be opened in the same direction by vehicles approaching from either direction; and will always be closed by vehicles going away from the gate in either direction.

When the short rod 89 is substituted for the longer looped rod 46, the parts will be associated as shown diagrammatically in Fig. 15; the gate frame will always swing open in one direction only and will always swing in the opposite direction to close the gate, regardless of the direction in which the vehicle is going. I have shown the rod 89 substituted for the rod 46, and in that case the gate frame will always swing open towards the left; but it is obvious that the rod 89 may be substituted for the rod 44, and in that case the gate frame will always swing open towards the right.

When the connecting rod 89 is used the operation will be as follows:

To open the gate, starting with the gate frame in closed position and the vehicle traveling from the right towards the gate; the wheel of the vehicle approaching the gate will depress the lever 74R towards the left to cause the rod 43 to pull the truck member 22 to the right to "break" the truck to the right, to cause the gate frame to swing towards the left, to the open position 170; and upon continued movement of the vehicle to the left the vehicle wheel will run on the lever 74L and depress it towards the left to cause the rod 45 to pull on the connecting rod 85 to turn the lever 37 towards the right to cause it to pull on the rod 89 to turn the truck member 21 towards the left, to "break" the truck to the left, to cause the gate to gravitate towards the right to closed position.

When the vehicle is going from L towards R, the gate frame being in closed position, the wheel of the vehicle will depress the lever 74L towards the right, the rod 45 moving towards the left will push on 85 to turn 37 towards the left to cause 37 to push 89 towards the right to push 21 towards the right to cause the truck to "break" to the right, resulting in swinging the gate frame outwardly towards the left to stop in the open position 170; and upon continued travel of the vehicle towards the right its wheel will depress the lever 74R towards the right to cause the rod 43 to move towards the left and push the member 22 to the left to "break" the truck to the left to cause the gate frame to swing inwardly towards the right and stop in closed position.

Here it will be noticed that the longitudinal slots 47 of the rods 43, 44, 45 and 46 are of such length that when the respective rods are moved longitudinally in one direction they will pull on the bolt 27, and when they are moved longitudinally in the opposite direction they will push on the same bolt; resulting in "breaking" the truck towards the left, or towards the right, according to the direction of movement of the respective rods.

I do not restrict the claims to the precise details of construction shown and described inasmuch as minor details may be varied and still keep within the scope of the claims.

Having fully described my invention what I claim as new and desire to secure by Letters Patent is:

1. In an automatic gate, the combination of a stationary post; a stationary block in line with the post; a first truck-member pivoted on said block; a second truck-member pivotally connected with said first truck-member and having a pivot-bearing, also having lateral branches each provided with a roller; arched guards engaged by said respective rollers; an adjusting bar provided with an eye; an axle having a pivot in the eye of the adjusting bar and a pivot in said bearing on said second truck-member; and means for "breaking" said truck-members to the right to effect swinging of the gate frame to the left and reversely "breaking" the truck-members to the left to effect swinging of the gate frame to the right.

2. In an automatic gate, the combination of aligned stationary posts; an axle-adjusting device adjustable on one post; a truck normally in line with both posts and "breakable" to the right and to the left; means for "breaking" the truck to the right; means for "breaking" the truck to the left; an axle pivoted on the truck and pivoted in the axle-adjusting device; and a gate frame fixed on the axle and responsive to the various inclinations thereof.

3. In a gate, the combination of a vertical gate-supporting post, an axle variably inclinable relatively to the axis of the post, a breakable truck carrying said axle, a gate-frame supported by said axle, crank shafts on opposite sides of the gate, and operating rods connected with the respective crank shafts and having relatively long loops, said long-loop operating rods being effective to break the truck to swing the gate frame away from a vehicle approaching the gate from either direction; and a short-loop operating-rod substitutable for one of said long-loop operating rods, and effective to break the truck to cause the gate-frame to always swing open in one direction.

4. In an automatic gate, axle-adjusting means comprising a cylindrical gate-supporting post having transverse notches; a compressible ring surrounding the post and having outwardly extended perforated members; an adjusting rod extending diametrically through the ring and through said notches in the post and having an eye-member, said adjusting rod having also a longitudinally slotted member extending outwardly between the outwardly extended members of the ring; an axle rotative on a pivot at its lower end and having at its upper end a pivot entered in the eye-member of said adjusting rod; and a bolt extending through the perforations in the extended members of the ring and through the longitudinal slot in the adjusting rod, and permitting the rod to slide on the bolt in the direction of the length of the rod, and effective to bind the ring on the post to prevent rotation of the ring.

In witness whereof I have hereunto signed my name at Springfield, Illinois, this 5th day of June, 1922.

EDWARD A. BIGLER.

Witnesses:
 WAYNE HUDSON,
 MARY F. MILLS.